US010329451B2

(12) United States Patent
Cox et al.

(10) Patent No.: US 10,329,451 B2
(45) Date of Patent: Jun. 25, 2019

(54) ALL-ORGANIC HIGH REFRACTIVE INDEX MATERIALS

(71) Applicant: Brewer Science Inc., Rolla, MO (US)

(72) Inventors: Robert Christian Cox, Rolla, MO (US); Raymond Devaughn, Rolla, MO (US)

(73) Assignee: Brewer Science, Inc., Rolla, MO (US)

( * ) Notice: Subject to any disclaimer, the term of this patent is extended or adjusted under 35 U.S.C. 154(b) by 405 days.

(21) Appl. No.: 14/968,058

(22) Filed: Dec. 14, 2015

(65) Prior Publication Data

US 2016/0177128 A1  Jun. 23, 2016

Related U.S. Application Data

(60) Provisional application No. 62/094,577, filed on Dec. 19, 2014.

(51) Int. Cl.
| | | |
|---|---|---|
| *C09D 5/33* | (2006.01) | |
| *C08G 73/06* | (2006.01) | |
| *C08G 75/025* | (2016.01) | |
| *C09D 179/04* | (2006.01) | |
| *C09D 181/02* | (2006.01) | |
| *C08G 75/0227* | (2016.01) | |

(52) U.S. Cl.
CPC ......... *C09D 181/02* (2013.01); *C08G 73/065* (2013.01); *C08G 73/0644* (2013.01); *C08G 75/025* (2013.01); *C08G 75/0227* (2013.01); *C09D 5/004* (2013.01); *C09D 179/04* (2013.01)

(58) Field of Classification Search
CPC ............. C08G 73/0644; C08G 73/026; C08G 73/0273; H01L 51/5253; H01L 51/5262; C09D 179/00; C08L 39/00
See application file for complete search history.

(56) References Cited

U.S. PATENT DOCUMENTS

| | | | | |
|---|---|---|---|---|
| 2004/0096757 A1* | 5/2004 | Tokuda | ................ | G02B 5/223 430/8 |
| 2012/0049308 A1* | 3/2012 | Nishimura | ......... | C08G 73/0273 257/432 |
| 2012/0070656 A1* | 3/2012 | Chung | ................ | C09D 5/006 428/338 |

(Continued)

OTHER PUBLICATIONS

International Search Report and Written Opinion dated Apr. 11, 2016 in corresponding PCT/US2015/066051, 12 pages.

(Continued)

*Primary Examiner* — Shane Fang
(74) *Attorney, Agent, or Firm* — Hovey Williams LLP

(57) ABSTRACT

Novel hyper-branched, dense, high-refractive-index polymers, and compositions utilizing those polymers are provided, along with methods of forming high refractive index films with those compositions. The refractive index of the material is at least about 1.8 at 400 nm. Further, it can be made into optically transparent thin films of only a couple hundred angstroms thickness to thick films of several micrometers thick, as well as into "bulk" solids. The use of a thermal acid or a photo acid generator facilitates cross-linking after the coating process.

20 Claims, 1 Drawing Sheet

(56) References Cited

U.S. PATENT DOCUMENTS

2012/0142878 A1    6/2012  Osawa et al.
2013/0154043 A1    6/2013  Kato et al.
2013/0214372 A1    8/2013  Nishimura et al.

OTHER PUBLICATIONS

You et al., "Highly Refractive Poly(phenylene thioether) Containing Triazine Unit," Macromolecules 2010, 43, 4613-4615.
Mahapatra et al., "Hyperbranched Aromatic Polyamines with s-Triazine Rings," Journal of Applied Polymer Science, vol. 106, pp. 95-102 (2007).
Mariz et al., "Molecular architecture effects in two-photon absorption: from octupolar molecules to polymers and hybrid polymer nanoparticles based on 1,3,5-triazinet," Journal of Materials Chemistry B, 2013, 1, 2169-2177.

* cited by examiner

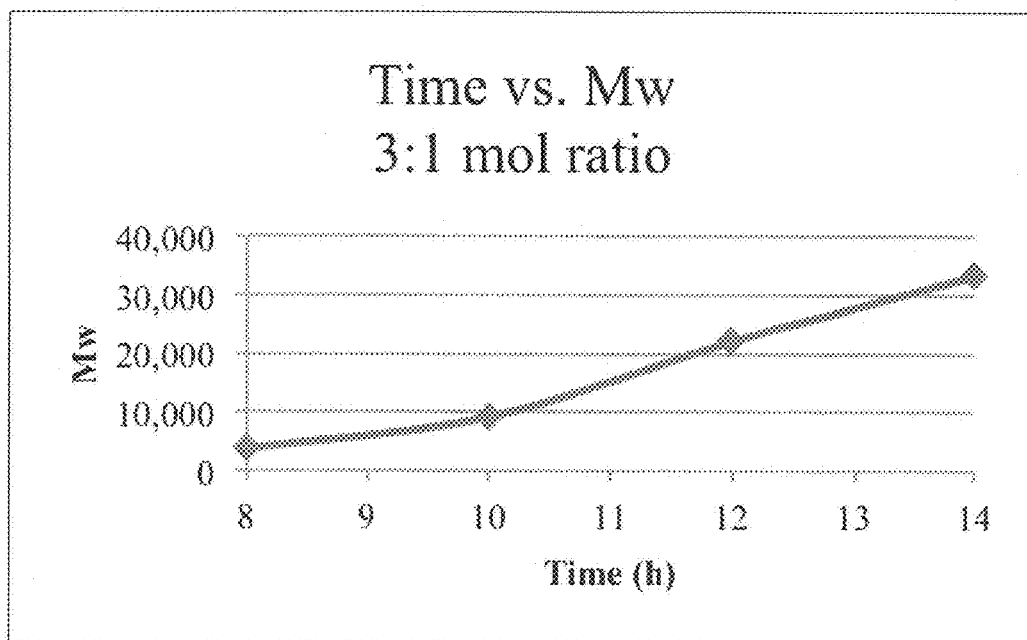

ALL-ORGANIC HIGH REFRACTIVE INDEX MATERIALS

RELATED APPLICATION

The present application claims the priority benefit of U.S. Provisional Patent Application Ser. No. 62/094,577, filed Dec. 19, 2014, entitled ALL-ORGANIC HIGH REFRACTIVE INDEX MATERIALS, incorporated by reference in its entirety herein.

FIELD OF THE INVENTION

The present invention is broadly concerned with a polymer that is optically transparent in the region of visible light and has a high refractive index, as well as compositions and methods utilizing those polymers.

DESCRIPTION OF THE PRIOR ART

In the design of any optical system, very close attention must be devoted to the optical parameters of the materials used. The refractive indexes of all of the materials in the system need to be aligned in specific ways in order to optimize the performance of the system. Often transparent materials with high refractive indexes are required for an optimized solution. This is particularly difficult to achieve using organic polymers. Organic polymers are primarily comprised of carbon atoms, which have very low electron density for polarization and interaction with light, leading to a lower refractive index. More electron polarization can be created through the delocalization of electrons, particularly in aromatic ring structures. However, if delocalization is too widespread, the electrons undergo electronic transition in the energy range of visible light, leading to colored materials. To overcome the low electron density of carbon and tendency toward colored materials in highly polarizable carbon bonds, atoms with more electrons are added for improved interaction with light. Atoms such as sulfur, bromine, iodine, and phosphorous are added to the organic matrix either through addition of additives or directly bound in the organic matrix. However, as environmental regulations tighten, the use of organo-halogen (chlorine, bromine, and iodine)-containing materials is being phased out.

Another method to increase the refractive index of materials is to incorporate other atoms of significant electron density. These are typically metals or metal oxides. The difficulty with adding inorganic "fillers" into the polymer matrix are several fold. First, the inorganic material and organic polymers typically do not mix well, leading to phase separation and nonhomogeneous materials. The mixing problem is compounded by the need for very high loadings of the inorganic component. To achieve high indexes, large quantities of fillers are required, leading to even more opportunity for phase separation. Should homogenous mixing of the components be achieved, the refractive index difference between the particles in the matrix and the matrix itself leads to light scattering and reduction in optical clarity. To eliminate the scattering, very small particles are required such that they are less than one tenth the wavelength of the light. For the visible range down to 400 nm, this requires particles of less than 40 nm in size. The necessary nanoparticles do not have a great deal of volume remaining to increase the refractive index. While high refractive index materials do exist that are created through the use of nanoparticle incorporation, they are difficult to manufacture and expensive due to the nature of nanoparticles.

There is a need for new polymers and compositions for forming high refractive index films that avoid the above problems.

SUMMARY OF THE INVENTION

A method of forming a high refractive index self-sustaining body is provided. The method comprises forming a composition into the self-sustaining body, with the composition comprising a polymer dispersed or dissolved in a solvent system. The polymer comprises a first monomer selected from the group consisting of triazines, and a second monomer comprising at least two aromatic rings and at least three atoms individually selected from the group consisting of Group V and VI atoms.

The invention further provides a high refractive index structure comprising a self-sustaining body. The body is formed from a composition comprising a hyperbranched polymer that comprises a first monomer selected from the group consisting of triazines, and a second monomer comprising at least two aromatic rings and at least three atoms individually selected from the group consisting of Group V and VI atoms.

In another embodiment, a novel polymer is provided. The polymer comprises recurring moieties having the formula

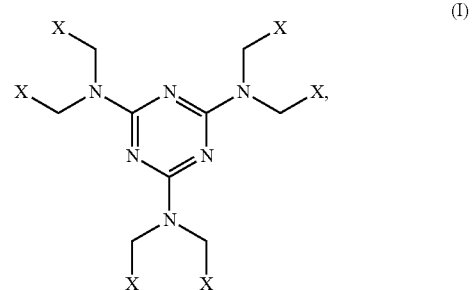

where each X is individually selected from the group consisting of

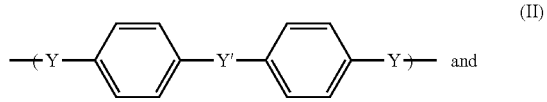

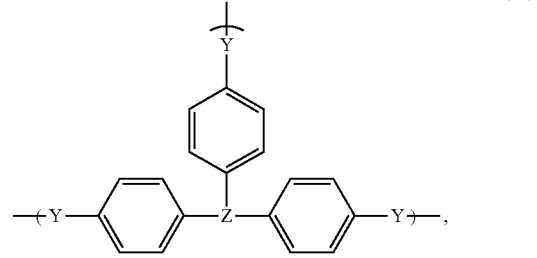

where:
each Y and Y' is individually selected from the group consisting of Group VI atoms;
each Z is individually selected from the group consisting of Group V atoms; and
X is bonded to (I) through a first Y.

Finally, the invention provides a composition comprising this polymer dispersed or dissolved in a solvent system. This composition is useful for forming a high refractive index layer.

BRIEF DESCRIPTION OF THE DRAWINGS

The FIG. 1 is a graph showing the reaction time vs. weight average molecular weight for 2.5:1 mol ratio 4,4'-thiobis-benzenethiol:Cymel® 303LF (80° C.).

DETAILED DESCRIPTION OF THE PREFERRED EMBODIMENTS

The present invention is broadly concerned with hyper-branched, dense, high-refractive-index polymers, and compositions including those polymers. These compositions are used to form high refractive index films.

Inventive Polymer

The inventive polymer is a sol-gel polymer and comprises first and second monomers. Broadly, the polymer is created in a very dense manner to form the sol (a dense organic colloidal particle), and then further crosslinked after coating using the same reaction mechanism to form the gel.

The first monomer is a multifunctional monomer capable of polymerizing with itself and other molecules. Particularly preferred first monomers are triazines. As used herein, "triazines" refers to nitrogen-containing heterocycles. More particularly, "triazines" refers to six-membered rings having three carbon atoms and three nitrogen atoms as ring members. "Triazines" is intended to include substituted triazines or triazine derivatives, with melamines or aminoplasts being particularly preferred triazines for use as the first monomer in the inventive polymer.

A particularly preferred triazine for use as the first monomer is an aminoplast sold by Cytec Industries under the name Cymel® 303LF, which has the following structure:

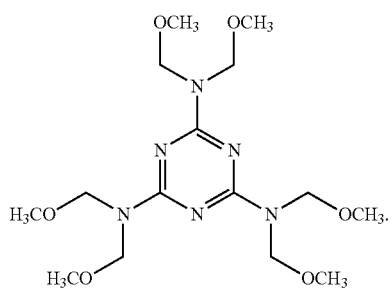 [SMILES: COCN(COC)c1nc(N(COC)COC)nc(N(COC)COC)n1]

The first monomer preferably is present in the polymer in an amount of from about 25% by weight to about 50% by weight, more preferably from about 30% by weight to about 45% by weight, and even more preferably from about 35% by weight to about 40% by weight, based upon the total weight of the monomer solids taken as 100% by weight.

The second monomer can be referred to as a "heavy atom monomer," because the monomer preferably includes atoms (preferably at least 3 such atoms, and preferably non-metals) having an atomic number that is higher than that of carbon. Preferred such atoms are polarizable and selected from the group consisting of Group V (N, P, As, Sb, and Bi) and VI (O, S, Se, Te, and Po) atoms, with sulfur and nitrogen being particularly preferred. In addition to the noted "heavy atoms," the second monomer preferably comprises at least two rings. More preferably these rings are aromatic, and even more preferably the rings are phenyl rings. The rings will be joined by one of the "heavy atoms," either di- or trivalent, depending upon whether there are two or three rings to be joined. Additionally, the second monomers will include at least one (and preferably 2 or more) "heavy atom" that is connected only to a single ring so that it has room to bond with the first monomer.

One preferred compound for use as the second monomer is 4,4'-thiobisbenzenethiol ("TBBT"), which has the following structure:

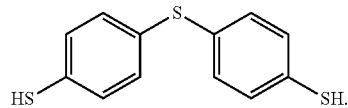 [SMILES: Sc1ccc(Sc2ccc(S)cc2)cc1]

The second monomer is typically present in the polymer in an amount of from about 50% by weight to about 75% by weight, preferably from about 55% by weight to about 70% by weight, and more preferably from about 57% by weight to about 67% by weight, based upon the total weight of the monomer solids taken as 100% by weight. The molar ratio of the first monomer to the second monomer is preferably from about 1:8 to about 1:1, more preferably from about 1:3 to about 1:2.

The first and second monomers described above are polymerized using an acid catalyst. Preferred catalysts include those selected from the group consisting of sulfonic acids, sulfinic acids, p-toluenesulfonic acid, and Lewis acids. The catalyst is present in the material at levels of from about 0.25% by weight to about 2% by weight, preferably from about 0.3% by weight to about 1.5% by weight, and more preferably about 0.3% by weight to about 1% by weight, based upon the total weight of the second monomer (i.e., the "heavy atom monomer") taken as 100% by weight.

A particularly preferred polymerization method utilizes an acid catalyst that can be removed completely after initial sol formation. A preferred removable catalyst would be a sulfonic-acid-functionalized polystyrene bead or a heterogeneous Lewis acid that could be removed by filtration after initial sol formation. Such a heterogeneous Lewis acid catalyst would include those selected from the group consisting of magnesium, zinc, or zinc phosphate (anhydrous or hydrate). The catalytic loading for such a material is from about 2% by weight to about 50% by weight, preferably from about 8% by weight to about 40% by weight, and more preferably from about 20% by weight to about 30% by weight, based upon the total weight of the second monomer (i.e., the "heavy atom monomer") taken as 100% by weight.

A solvent or solvents is added. Suitable solvents for inclusion in the solvent system include those selected from the group consisting of cyclohexanone, cyclopentanone, and anisole. The solvent system is present in the material at levels of from about 20% by weight to about 80% by weight, preferably from about 30% by weight to about 70% by weight, and more preferably from about 40% by weight to about 60% by weight, based upon the total weight of the entire polymerization formulation taken as 100% by weight.

Optionally, an alcohol may be added to the solution. The addition of an alcohol to the solvent systems inhibits the triazine's (e.g., Cymel® 303LF, which is N-hexa-(methoxylmethyl)melamine) self-reaction, allowing it to further react with the second monomer in solution. This behavior allows for a more complete polymerization and increases the polymer viscosity. Suitable alcohols include those selected from the group consisting of n-butanol, tert-butanol, and methanol. Preferably, the alcohol is present during polymerization at levels of from about 10% by weight to about 30% by weight, and more preferably from about 15% by weight to about 25% by weight, based upon the total weight of the solvent taken as 100% by weight.

The sol polymerization reaction is performed by combining the first and second monomers, the catalyst, alcohol (if utilized) and the solvent system in a flask under inert gas flow and then heating to the preferred temperature for the preferred time. The polymerization is stopped prior to formation of an insoluble gel-state polymer. This is monitored through visual observation, with preferred polymerization times being from about 6 hours to about 18 hours, and more preferably from about 7 hours to about 14 hours. Preferred temperatures for the polymerization reaction are from about 50° C. to about 100° C., more preferably from about 60° C. to about 90° C., and even more preferably from about 60° C. to about 80° C. Increasing reaction time increases the molecular weight of the polymer (see the FIGURE). The reaction of the most preferred first and second monomers (i.e., the Cymel® 303LF aminoplast and TBBT) is shown below:

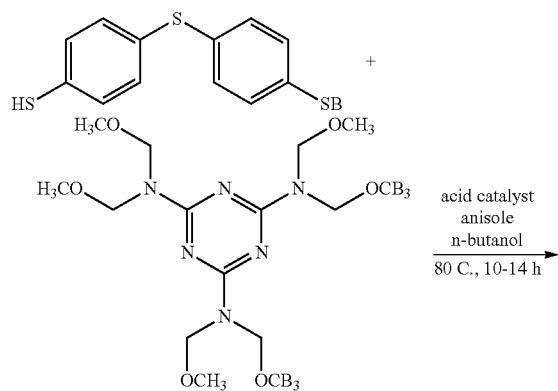

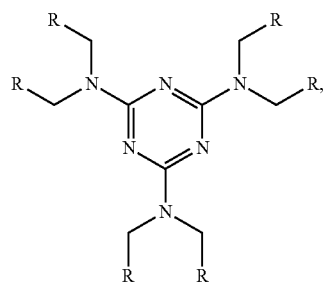

where each of R is individually selected from the group consisting of —H, —OCH$_3$, —S(C$_6$H$_4$SH)$_2$, —CH$_2$— (in instances where the first monomer self-crosslinks), and —OCH$_2$(R$_1$), where R$_1$ is a moiety remaining after an —OH group leaves an alcohol (in instances where an alcohol was included as a polymerization inhibitor, e.g., alkyls, and particularly C$_1$-C$_8$ alkyls, and more preferably C$_1$-C$_4$ alkyls). These varying possibilities for R are due to the fact that not all methoxy (—OCH$_3$) groups on the aminoplast (first monomer) will react with a second monomer. The degree of polymerization will impact this, with the degree of polymerization being impacted by time, as noted above.

When a Cymel® 303LF molecule is reacted to its fullest extent with TBBT, it will have following structure:

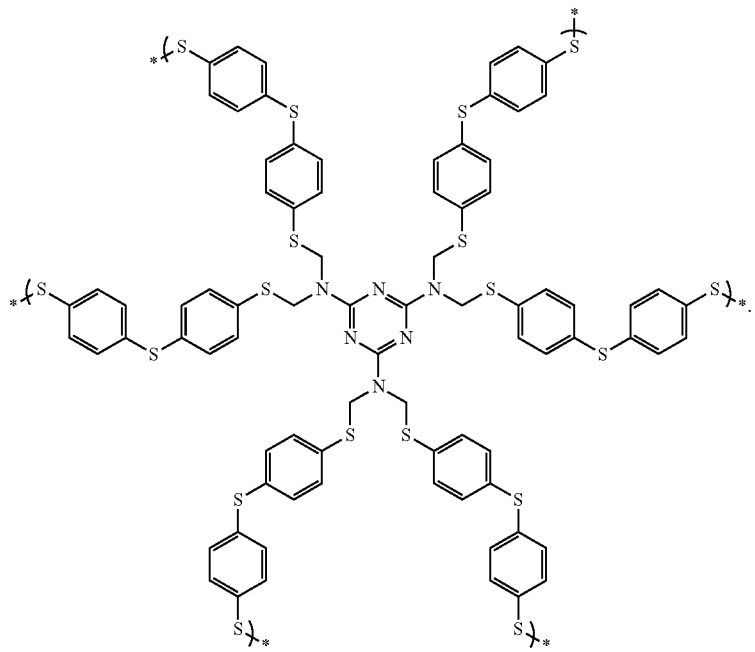

It will be appreciated that the inventive polymers are hyperbranched polymer matrixes. Thus, the * in the above structure denotes locations of possible bonding of the second monomer (in this instance, the TBBT moiety) to other first monomers (in this instance, other Cymel® 303LF aminoplast moieties). And/or, the —H could remain bonded to the sulfur atom at the *.

In one preferred embodiment, the first monomer has the formula

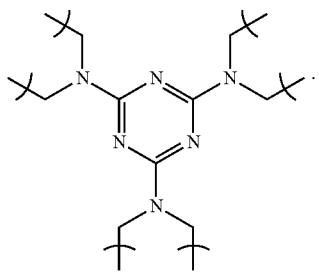

(A)

In another preferred embodiment, the second monomer has the formula

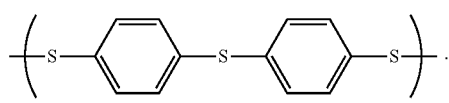

(B)

In a further preferred embodiment, both of first monomer (A) and second monomer (B) are present.

In yet another embodiment, the inventive polymer comprises recurring moieties having the formula

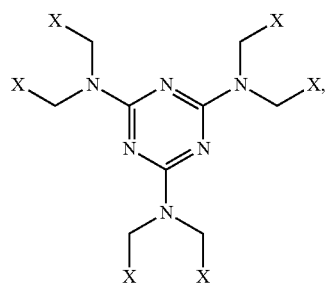

(I)

where each X is individually selected from the group consisting of

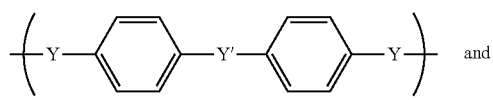

(II)

and

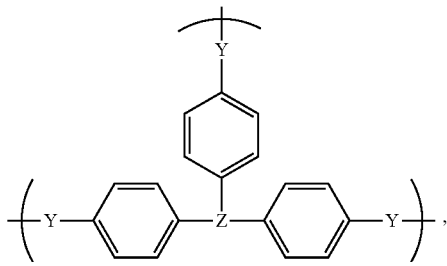

(III)

where:
each Y and Y' is individually selected from the group consisting of Group VI atoms (most preferably sulfur);
each Z is individually selected from the group consisting of Group V atoms (most preferably nitrogen); and
X is bonded to (I) through a first Y.

In this embodiment, (I) corresponds to the first monomer (i.e., the triazine) while (II) and (III) correspond to preferred second monomers (i.e., the "heavy atom monomers").

Even more preferably, a second moiety (I) is bonded to a second Y on the X moiety. In the most preferred embodiment, X is (II), and Y and Y' are —S—, which corresponds to the TBBT/Cymel® 303LF reaction described previously. The molar ratios and % by weight are as described previously.

Regardless of the first and second monomers selected, the resulting polymer is present in a final sol gel polymer solution at levels of from about 5% by weight to about 70% by weight, preferably from about 10% by weight to about 55% by weight, and more preferably from about 40% by weight to about 55% by weight, based upon the total weight of the sol gel polymer solution taken as 100% by weight.

The preferred polymer weight average molecular weight is from about 5,000 to 30,000 Daltons, and more preferably from about 10,000 Daltons to about 20,000 Daltons. The preferred polymer is also substantially free of metals. That is, the preferred polymer has less than about 5% by weight metal atoms, preferably less than about 1% by weight metal atoms, and more preferably about 0% by weight metal atoms, based upon the total weight of the polymer taken as 100% by weight.

Inventive Compositions

The inventive compositions are formed by thoroughly mixing the sol with a solvent system and an acid catalyst (separate from the catalyst that was used to form the polymer matrix). Preferred acid catalysts for use in the high refractive index composition are latent acid catalysts or acid generator such as photo acid generators (PAGs) or thermal acid generators (TAGs). Latent acid catalysts improve storage life of the formulations but are not required for the coating formation.

Suitable PAGs include those selected from the group consisting of tri- or diarylsulfonium salts and tri- or diaryliodonium salts. When present, the PAG is present in the material from about 0.25% by weight to about 5% by weight, preferably from about 0.5% by weight to about 4% by weight, and more preferably from about 1% by weight to about 3% by weight, based upon the total weight of the solids in the high refractive index composition taken as 100% by weight.

Suitable TAGs include those selected from the group consisting of quaternary and tertiary ammonium blocked triflic acid thermal acid generators. A preferred TAG is an amine-blocked sulfonium compound. When present, the TAG is present in the material from about 0.25% by weight to about 3% by weight, preferably from about 0.5% by weight to about 2% by weight percent, and more preferably about 1% by weight, based upon the total weight of the solids in the high refractive index composition taken as 100% by weight.

A solvent or solvents is added. Suitable solvents for inclusion in the solvent system include those selected from the group consisting of cyclohexanone, cyclopentanone, and anisole. The solvent system is present in the material from about 40% by weight to about 98% by weight, and preferably from about 60% by weight to about 95% by weight, based upon the total weight of the high refractive index composition taken as 100% by weight. It will be appreciated that the amount of solvent or solvents added to the material may be different depending on the deposition method utilized.

Inventive High Refractive Index Films

The above-described high refractive index composition can be coated through a variety of methods including those selected from the group consisting of spin coating, spray coating, slot coating, slot die coating, and dip coating. Typical substrates on which the composition is coated include those selected from the group consisting of semiconductors, silicon, silicon dioxide, silicon nitride, aluminum gallium arsenide, aluminum indium gallium phosphide, gallium nitride, gallium arsenide, indium gallium phosphide, indium gallium nitride, indium gallium arsenide, aluminum oxide, glass, quartz, polycarbonates, polyesters, acrylics, polyurethanes, papers, ceramics, and metals.

After coating, the substrate may be baked to remove or evaporate any remaining solvents. Preferable bake temperatures are from about 80° C. to about 205° C. Preferred bake times range from about 30 seconds to about 600 seconds, more preferably from about 60 seconds to about 360 seconds. After coating and baking, the thickness of the material on the substrate is preferably from about 0.25 µm to about 30 µm, and even more preferably from about 1 µm to about 20 µm. An especially preferred bake process is a two-stage bake with a first bake at 100° C. to evaporate most solvent, and a second bake at 205° C. to activate the TAG. After the material is coated and baked, if a PAG is present, the baked layer is then exposed to UV, broadband, DUV, or i-line radiation at about 10 mW to about 2000 mW, preferably for a time period of from about 1 second to about 20 seconds, to activate the PAG. Under either approach, the acid generated causes the material to cure, forming further reactions between the first and second monomers as described above when describing the polymerization process (e.g., unreacted methoxy groups from the aminoplast would react with the second monomer, preferably through the "heavy atoms").

A final annealing stage is preferred with a bake time of from about 1 minute to about 30 minutes, more preferably from about 5 minutes to about 20 minutes, and even more preferable from about 10 minutes to about 15 minutes. Annealing temperatures range from about 135° C. to about 205° C. During annealing, further curing takes place, and thus further reactions between the first and second monomers, as described above. It will be appreciated that the above polymerization, curing, and annealing can be used to further compact and densify the polymer, thus increasing the refractive index of the film.

The combination of an inherently dense polymer matrix (sol-gel) and the incorporation of heavy atoms leads to the creation of a completely organic, metal-free, high-refractive-index, optically clear polymer film. Final coatings according to the invention have a refractive index of at least about 1.8, preferably at least about 1.83, and more preferably from about 1.85 to about 1.86 at 400 nm. Furthermore, cured coatings having a thickness of about 100 µm will have a percent transmittance of at least about 80%, preferably at least about 90%, and even more preferably least about 95% at wavelengths of about 400 nm.

The inventive films or coatings can be used in optical systems to act as a light extraction layer or as an optical waveguide. A high-refractive-index transparent film according to the invention could also have applications in the formation of lens elements in a variety of applications including, optical imaging and eyeglass coatings. Finally, films with a high refractive index are useful in a wide array of microelectronic devices as well.

Other Inventive High Refractive Index Structures

The foregoing describes a preferred embodiment where the inventive composition is used to form a film that is supported on a substrate. Advantageously, the compositions can also be used to form a "free-standing" or self-supporting structure. In this instance, the composition could be subjected to molding (e.g., injection molding), machining, and/or other conventional processes to form the desired shape. The process would be set up to subject the composition to the above solvent removal (as needed) and curing conditions so as to form the solid material. The resulting structure would possess the same properties as those disclosed previously. One example of such a structure is a lens, such as a lens for corrective eyeglasses.

EXAMPLES

The following examples set forth preferred methods in accordance with the invention. It is to be understood, however, that these examples are provided by way of illustration and nothing therein should be taken as a limitation upon the overall scope of the invention.

Example 1

Synthesis of Polymer 1—Comparative Example

The following was added to a round bottom flask fitted with a condenser: 8.00 grams (0.03195 mol) of 4,4'-thiobis-benzenethiol ("TBBT," Sigma-Aldrich St. Louis, Mo.), 6.33 grams (0.0213 mol) of tris-(2,3-epoxypropyl)isocyanurate ("TEPIC," Nissan Chemical, Tokyo, Japan), and 21.50 grams of cyclohexanone (Sigma-Aldrich St. Louis, Mo.). The mixture was heated to 80° C. and stirred for 16 hours. The resulting material was cooled to room temperature and soon became cloudy. The mixture was diluted with 35.82 grams of propylene glycol monomethyl ether ("PGME," Ultra Pure Solutions, Inc., Castroville, Calif.) down to 20% solids and filtered.

A cured film was formed by spin coating the mixture on a silicon substrate at 1,500 rpm, followed by baking at 205° C. for 1 minute. Refractive index (RI) measurements were taken of the cured film on a VASE® M2000 ellipsometer, and the RI was measured at 1.74 at 400 nm.

Example 2

Synthesis of a Series of Polymers

A series of 1.3:1, 1.6:1, 1.9:1, and 3.9:1 molar ratio TBBT:CYMEL® 303LF polymers were prepared. Each system was 50% solids in cyclohexanone, with catalytic loading of pTSA at 1% of the weight of TBBT. The polymerizations were heated to 80° C. for 3.5 hours.

The resulting mixture was diluted down to 3% by weight solids by adding additional cyclohexanone. A photoacid generator (CPI-6992, Aceto Corp., Port Washington, N.Y.) was added to the mixture at a loading of 2% by weight, based upon the total weight of the solids taken as 100% by weight.

Cured films were formed by spin coating the mixture on silicon substrates at 2,500 rpm, followed by baking at 220° C. for 2 minutes. All cured films were analyzed on a VASE® M2000 ellipsometer and were optically transparent in the visible region and had a refractive index of over 1.8 at 400 nm. The 3.9:1 (4:1) ratio had an RI of 1.85.

Example 3

Synthesis of Polymer 2

The following ingredients were added to a jacketed reactor flask fitted with a condenser: 200 grams (798.72 mol) of TBBT, 124.601 grams (319.489 mol) of CYMEL® 303LF, 1.0 gram of pTSA, 389.52 grams of anisole (Sigma-Aldrich, St. Louis, Mo.), and 97.38 g n-butanol (Sigma-Aldrich, St. Louis, Mo.). The mixture diluted down from 40% solids to 15% solids by mixing in an additional 2,082.5 grams cyclohexanone.

The material was immersed in a dual-bed ion exchange system comprised of Ambersep™ 200 H Resin (ROHM & HAAS Chemicals LLC, Philadelphia, Pa.) and Amberlyst A26 (Sigma Aldrich, St. Louis, Mo.) for 4.5 hours. The resin beads were filtered off through 0.1-μm filter. The following ingredients were then added to the system: PAG (CPI-6992), at a loading of 8% by weight of the solids and Megaface R30N surfactant (DIC Corporation, Chiba, Japan), at a loading of 0.02% by weight of the solids.

Cured films were formed by spin coating the mixture on silicon substrates at 1,500 rpm, followed by baking at 100° C. for 1 minute & UV exposure for 20 seconds. This was followed by a two-stage bake at 100° C. for 1 minute, then a final anneal at 205° C. for 15 minutes. All cured films were analyzed on a VASE® M2000 ellipsometer. All were optically transparent in the visible region and had a refractive index at or over 1.84 at 400 nm.

Example 4

Synthesis of Polymer 3

The following was added to a round bottom flask fitted with a condenser: 22.4608 grams (0.0897 mol) of TBBT, 14.0139 grams (0.0359 mol) of CYMEL® 303LF, 0.1123 gram of pTSA, and 29.1798 grams of anisole. The mixture was heated to 80° C. and stirred for 14 hours. The resulting material was cooled to room temperature and filtered. The solution was diluted to 10% solids in cyclohexanone and filtered. Next, 0.3647 grams of TAG 2689 (a quaternary ammonium blocked triflic acid thermal acid generator, King Industries, Inc., Norwalk, N.J.) was added. The resulting material was spin coated onto a 4" silicon wafer using the following conditions: 2,000 rpm, 10,000 rpm/s, 60 seconds, cure bake: 135° C. for 1 minute, and anneal at 205° C. for 2 minutes. Refractive index of 1.85 (at 400 nm) of the resulting film was determined using a VASE® M2000 ellipsometer (J.A. Woollam, Co. Inc. Lincoln, Nebr.). The polymer, and thus the resulting film, was optically transparent in the visible region, and the polymer exhibited a high molecular weight (Mw) of 57,443.

Example 5

Synthesis of Polymer 4

The following was added to a round bottom flask fitted with a condenser: 30.00 grams (0.119.808 mol) of TBBT, 19.690 grams (47.923 mol) of CYMEL® 303LF, 6.60 grams of $Zn_2(PO_4)3 \cdot xH_2O$, 38.952 grams of anisole, and 9.738 grams n-butanol. The mixture was heated to 80° C. and stirred for 12 hours. The resulting material was cooled to room temperature and filtered. The solution was diluted to 10% solids in cyclohexanone and filtered. Next, 0.9738 grams of CPI 6992 PAG was added. The resulting material was spin coated onto a 4" silicon wafer using the following conditions: 2,500 rpm, 10,000 rpm/s, 60 seconds, PAB: 100° C. for 1 minute, UV exposure 20 seconds, PEB: 100° C. for 1 minute, anneal at 205° C. for 15 minutes. Refractive index of 1.85 (at 400 nm) of the resulting film was determined using a VASE® M2000 ellipsometer (J.A. Woollam, Co. Inc. Lincoln, Nebr.). The polymer was optically transparent in the visible region and had a molecular weight (Mw) of ~28,000.

We claim:

1. A method of forming a high refractive index self-sustaining, self-supporting body, said method comprising forming a composition into the self-sustaining, self-supporting body, said composition comprising a polymer dispersed or dissolved in a solvent system, said polymer comprising first and second monomers, wherein said first monomer has the formula

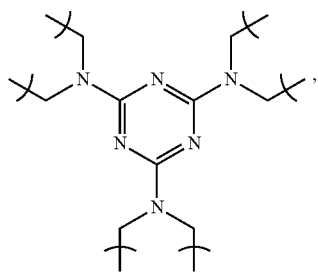 [SMILES: CCN(CC)c1nc(N(CC)CC)nc(N(CC)CC)n1]

and said second monomer comprises at least two aromatic rings and at least three atoms individually selected from the group consisting of Group V and VI atoms.

2. The method of claim 1, wherein said polymer is a sol-gel polymer.

3. The method of claim 1, wherein the molar ratio of said first monomer to said second monomer is from about 1:8 to about 1:1.

4. The method of claim 1, wherein said second monomer is present in said composition at levels of from about 50% to about 75% by weight, based upon the total weight of the monomer solids taken as 100% by weight.

5. The method of claim 1, wherein said second monomer comprises at least two phenyl rings and at least three atoms selected from the group consisting of sulfur and nitrogen.

6. The method of claim 5, wherein said second monomer has the formula

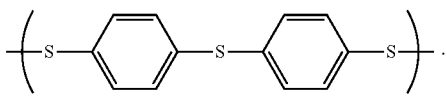

7. The method of claim 1, wherein said composition further comprises an acid generator.

8. A method of forming a high refractive index self-sustaining body, said method comprising forming a composition into the self-sustaining body, said composition comprising a polymer dispersed or dissolved in a solvent system, said polymer comprising first and second monomers, wherein said first monomer has the formula

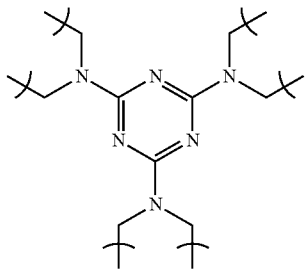 [SMILES: CCN(CC)c1nc(N(CC)CC)nc(N(CC)CC)n1]

and said second monomer comprises at least two aromatic rings and at least three atoms individually selected from the group consisting of Group V and VI atoms.

9. The method of claim 8, wherein said self-sustaining body is in the form of a layer.

10. The method of claim 9, wherein said layer is supported on a substrate.

11. The method of claim 10, wherein said substrate is selected from the group consisting of semiconductors, silicon, silicon dioxide, silicon nitride, aluminum gallium arsenide, aluminum indium gallium phosphide, gallium nitride, gallium arsenide, indium gallium phosphide, indium gallium nitride, indium gallium arsenide, aluminum oxide, glass, quartz, polycarbonates, polyesters, acrylics, polyurethanes, papers, ceramics, and metals.

12. The method of claim 1, wherein said forming comprises subjecting said composition to molding or machining to form the composition into said self-sustaining, self-supporting body.

13. The method of claim 9, further comprising heating said layer so as to cause solvent system evaporation.

14. The method of claim 9, further comprising curing said layer.

15. The method of claim 14, wherein said composition further comprises an acid generator and further comprising causing said acid generator to generate an acid, wherein said curing is initiated by said acid, forming an initially cured layer.

16. The method of claim 14, wherein said curing causes reactions between said first and second monomers.

17. The method of claim 14, wherein said first monomer comprises at least one unreacted methoxy group, and said curing causes one of said atoms on said second monomer to react with said methoxy group.

18. The method of claim 15, further comprising annealing said initially cured layer so as to further cure said initially cured layer and form a final cured layer.

19. The method of claim 14, wherein said cured layer has a refractive index of at least about 1.8 at a wavelength of about 400 nm.

20. The method of claim 14, wherein said cured layer has a percent transmittance of at least about 80% of light at a wavelength of about 400 nm and at a layer thickness of about 100 μm.

* * * * *